(12) United States Patent
Matsui

(10) Patent No.: US 12,176,148 B2
(45) Date of Patent: Dec. 24, 2024

(54) ELECTRONIC COMPONENT

(71) Applicant: Murata Manufacturing Co., Ltd., Nagaokakyo (JP)

(72) Inventor: Togo Matsui, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 18/610,464

(22) Filed: Mar. 20, 2024

(65) Prior Publication Data

US 2024/0222012 A1 Jul. 4, 2024

Related U.S. Application Data

(63) Continuation of application No. 18/134,074, filed on Apr. 13, 2023, now Pat. No. 11,961,672, which is a continuation of application No. 17/380,062, filed on Jul. 20, 2021, now Pat. No. 11,657,967, which is a continuation of application No. 16/594,167, filed on Oct. 7, 2019, now Pat. No. 11,101,069.

(30) Foreign Application Priority Data

Oct. 11, 2018 (JP) .................. 2018-192869
Aug. 6, 2019 (JP) .................. 2019-144855

(51) Int. Cl.
*H01G 4/008* (2006.01)
*H01G 4/232* (2006.01)
*H01G 4/30* (2006.01)

(52) U.S. Cl.
CPC ............. *H01G 4/008* (2013.01); *H01G 4/232* (2013.01); *H01G 4/30* (2013.01)

(58) Field of Classification Search
CPC .......... H01G 4/008; H01G 4/012; H01G 4/12; H01G 4/232; H01G 4/30
See application file for complete search history.

(56) References Cited

PUBLICATIONS

Matsui, "Electronic Component", U.S. Appl. No. 18/134,074, filed Apr. 13, 2023.

*Primary Examiner* — Nathan Milakovich
(74) *Attorney, Agent, or Firm* — Keating & Bennett, LLP

(57) ABSTRACT

An electronic component includes a multilayer body including inner electrodes and dielectric layers that are alternately stacked, and outer electrodes that are electrically connected to the inner electrodes. The multilayer body includes first and second main surfaces opposite each other in a stacking direction, first and second side surfaces opposite each other in a width direction, and first and second end surfaces opposite each other in a length direction. At least one of the outer electrodes is located on at least one of the first side surface or the second side surface of the multilayer body and is directly connected to the inner electrodes at positions spaced away from the at least one of the first side surface or the second side surface toward the inside of the multilayer body.

17 Claims, 12 Drawing Sheets

ELECTRONIC COMPONENT

CROSS REFERENCE TO RELATED APPLICATIONS

This application claims the benefit of priority to Japanese Patent Application No. 2018-192869 filed on Oct. 11, 2018 and Japanese Patent Application No. 2019-144855 filed on Aug. 6, 2019. The entire contents of these applications are hereby incorporated herein by reference.

BACKGROUND OF THE INVENTION

1. Field of the Invention

The present invention relates to an electronic component.

2. Description of the Related Art

A known electronic component includes a multilayer body in which inner electrodes and dielectric layers are alternately stacked, and an outer electrode that is electrically connected to the inner electrodes and that is formed on a surface of the multilayer body.

Such an electronic component disclosed in Japanese Unexamined Patent Application Publication No. 2016-86118 is a multilayer ceramic capacitor including outer electrodes that are disposed on both end surfaces of a multilayer body and outer terminals that are disposed on both side surfaces thereof. In the multilayer ceramic capacitor, signal inner electrodes that are extended to the end surfaces of the multilayer body and ground inner electrodes that are extended to the side surfaces of the multilayer body are alternately stacked with dielectric layers interposed therebetween. The outer electrodes that are disposed on the end surfaces of the multilayer body are electrically connected to the signal inner electrodes. Ground outer terminals that are disposed on the side surfaces of the multilayer body are electrically connected to the ground inner electrodes.

However, the multilayer ceramic capacitor disclosed in Japanese Unexamined Patent Application Publication No. 2016-86118 has a problem in that the size of an effective region in which each signal inner electrode and the corresponding ground inner electrode overlap in a stacking direction decreases because portions of the ground inner electrode are extended to the side surfaces of the multilayer body, and an electrostatic capacity decreases accordingly.

SUMMARY OF THE INVENTION

Preferred embodiments of the present invention provide electronic components that each include outer electrodes on side surfaces of a multilayer body and that enables an effective region in which inner electrodes overlap in the stacking direction to be enlarged.

According to a preferred embodiment of the present invention, an electronic component includes a multilayer body in which a plurality of inner electrodes and a plurality of dielectric layers are alternately stacked, and a plurality of outer electrodes that are electrically connected to the plurality of inner electrodes. The multilayer body includes a first main surface and a second main surface that are opposite to each other in a stacking direction, a first side surface and a second side surface that are opposite to each other in a width direction perpendicular or substantially perpendicular to the stacking direction, and a first end surface and a second end surface that are opposite to each other in a length direction perpendicular or substantially perpendicular to the stacking direction and the width direction. At least one of the plurality of outer electrodes is located on at least one of the first side surface or the second side surface of the multilayer body and is directly connected to the plurality of inner electrodes at positions spaced away from the at least one of the first side surface or the second side surface toward an inside of the multilayer body.

The multilayer body may include a margin portion in which the plurality of inner electrodes are not present when a section of the multilayer body including the length direction and the width direction is viewed in the stacking direction. Each of the plurality of outer electrodes may include a through section that extends through the margin portion and is directly connected to the plurality of inner electrodes by the through section.

The multilayer body may include an outer layer portion in which the plurality of inner electrodes are not present except for the margin portion when a section of the multilayer body including the width direction and the stacking direction is viewed in the length direction. Each of the plurality of outer electrodes may include the through section also at a height position in the stacking direction at which the outer layer portion is located.

The plurality of outer electrodes may be located on at least one of the first side surface and the second side surface.

The plurality of inner electrodes may include a first inner electrode and a second inner electrode. The plurality of outer electrodes may include at least one first outer electrode that is located on at least one of the first end surface or the second end surface of the multilayer body and that is connected to the first inner electrode, and at least one second outer electrode that is located on at least one of the first side surface or the second side surface of the multilayer body and that is connected to the second inner electrode. The second inner electrode is preferably not in contact with the at least one of the first end surface or the second end surface of the multilayer body on which the at least one first outer electrode is located. The first inner electrode may include a notch that overlaps, in the stacking direction, a connection between the second inner electrode and the at least one second outer electrode.

A dimension of the margin portion in the width direction may be no less than about 5 μm and no more than about 30 μm.

The margin portion may include margin layers that are stacked in the width direction.

The second inner electrode may include Si and Ti. A mole ratio of Si to Ti included in an end portion of the second inner electrode in the width direction may be larger than that in a central portion of the second inner electrode in the width direction.

The plurality of outer electrodes and the plurality of inner electrodes may include a common material including a dielectric material, and an amount of the common material that is included in the plurality of outer electrodes may be larger than an amount of the common material that is included in the plurality of inner electrodes.

An average particle diameter of a dielectric particle that is included in the plurality of dielectric layers that are located between the plurality of inner electrodes may be larger than an average particle diameter of a dielectric particle that is included in the margin portion.

A dimension, in the width direction, of one of the plurality of inner electrodes that is located at a central portion in the stacking direction may be larger than a dimension, in the width direction, of another inner electrode that is located at an outer portion in the stacking direction.

According to preferred embodiments of the present invention, at least one of the plurality of outer electrodes is located on at least one of the first side surface or the second side surface of the multilayer body and is directly connected to the plurality of inner electrodes at positions spaced away from the at least one of the first side surface or the second side surface toward the inside of the multilayer body. That is, it is not necessary for the plurality of inner electrodes to include extended portions that protrude in the width direction for connection to the at least one of the plurality of outer electrodes. Accordingly, an effective region in which the plurality of inner electrodes overlap in the stacking direction can be enlarged, and characteristics of the electronic component can be significantly improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will hereinafter be described in detail with reference to the drawings. In the following description, an example of an electronic component according to the present invention is a multilayer ceramic capacitor. The electronic component, however, is not limited to the multilayer ceramic capacitor and may be another electronic component, such as an inductor or a LC filter, for example.

Figure 1:
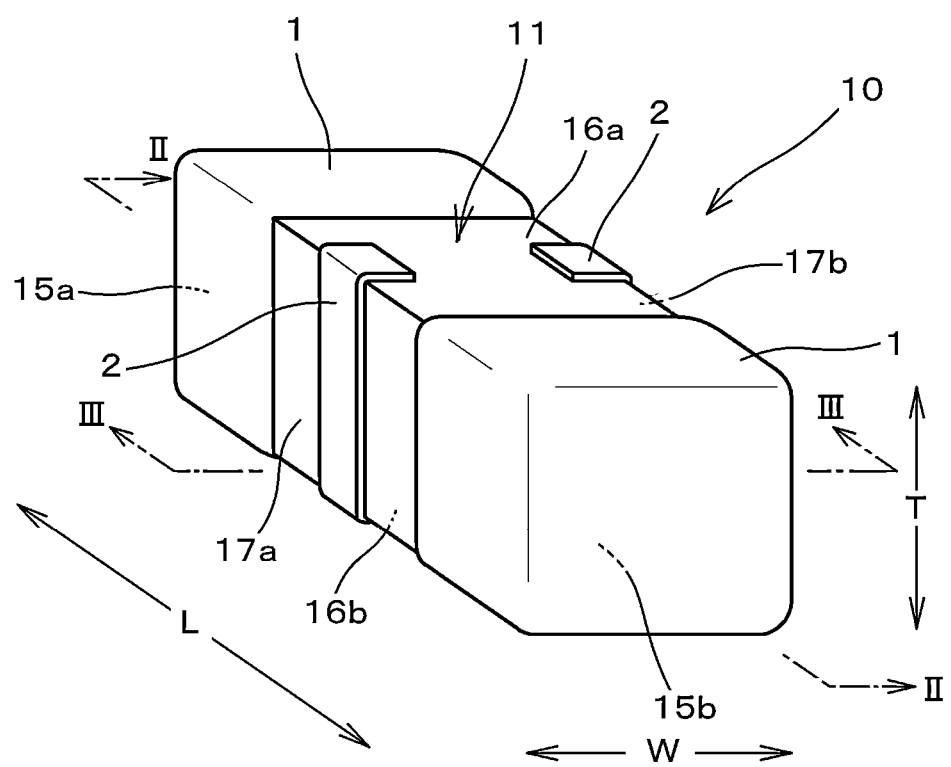
FIG. 1 is a perspective view of an example of a multilayer ceramic capacitor according to a preferred embodiment of the present invention.
Figure 2:
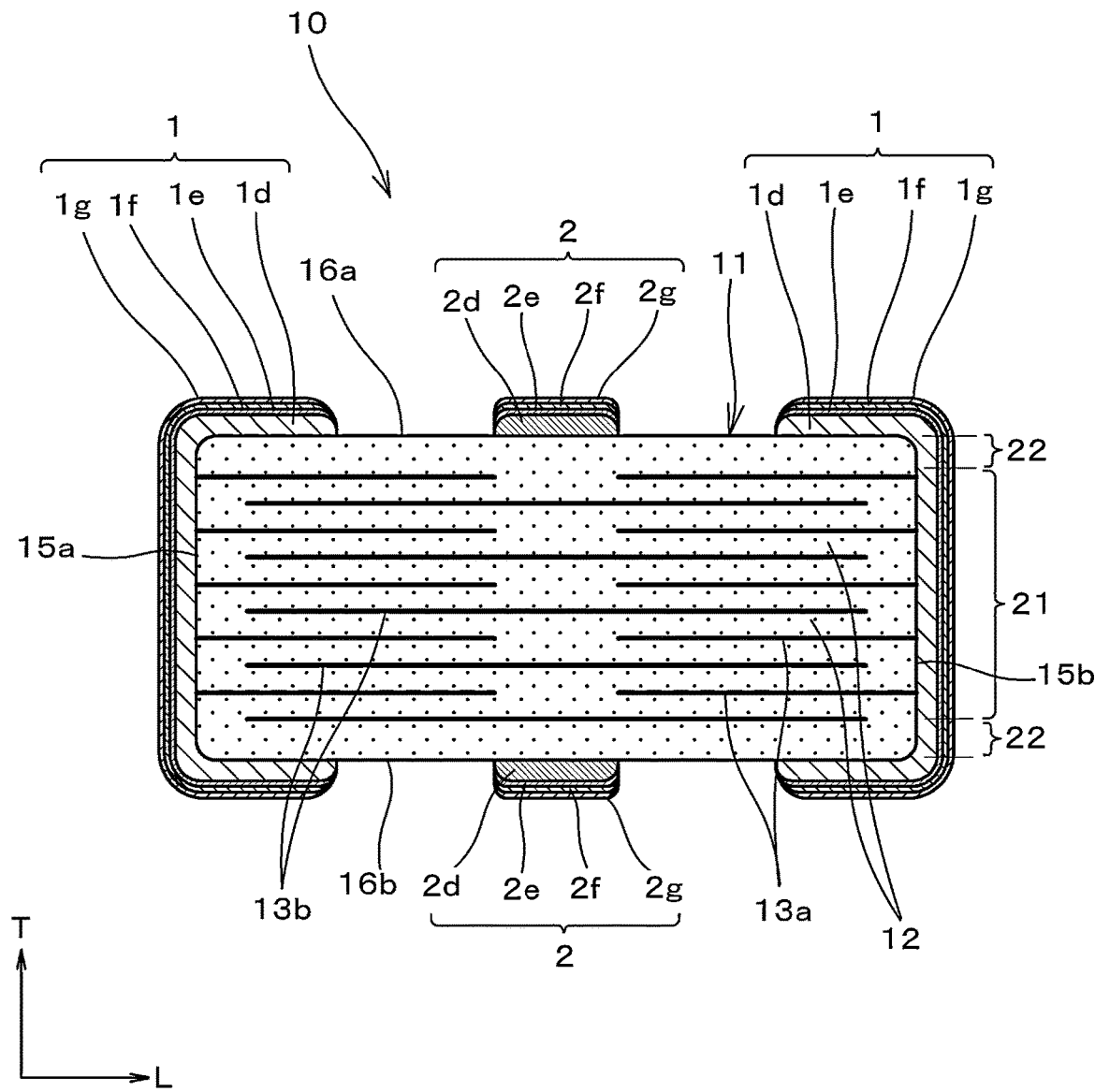
FIG. 2 is a sectional view of the multilayer ceramic capacitor shown in FIG. 1 taken along line II-II.
Figure 3:
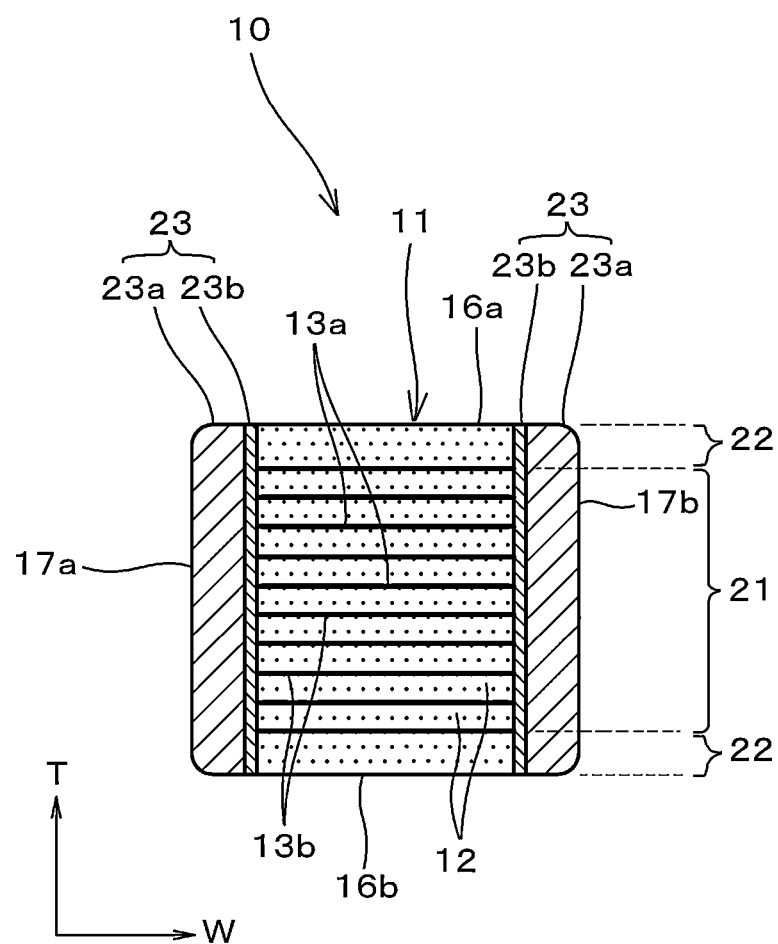
FIG. 3 is a sectional view of the multilayer ceramic capacitor shown in FIG. 1 taken along line III-III.

FIG. 1 is a perspective view of an example of a multilayer ceramic capacitor according to a preferred embodiment of the present invention. FIG. 2 is a sectional view of the multilayer ceramic capacitor 10 shown in FIG. 1 taken along line II-II. FIG. 3 is a sectional view of the multilayer ceramic capacitor 10 shown in FIG. 1 taken along line III-III.

As shown in FIG. 1 to FIG. 3, the multilayer ceramic capacitor 10 preferably has a rectangular or substantially rectangular cuboid shape overall and includes a multilayer body 11 and outer electrodes 1 and 2 that are disposed on surfaces of the multilayer body 11.

The multilayer body 11 includes a first end surface 15a and a second end surface 15b that are opposite to each other in a length direction L, a first main surface 16a and a second main surface 16b that are opposite to each other in a stacking direction T, and a first side surface 17a and a second side surface 17b that are opposite to each other in a width direction W.

The first end surface 15a and the second end surface 15b extend in the width direction W and the stacking direction T. The first main surface 16a and the second main surface 16b extend in the length direction L and the width direction W. The first side surface 17a and the second side surface 17b extend in the length direction L and the stacking direction T.

The outer electrodes 1 and 2 include first outer electrodes 1 and second outer electrodes 2. According to the preferred embodiment, as shown in FIG. 1, two of the first outer electrodes 1 are disposed on the first end surface 15a and the second end surface 15b that are opposite to each other, and two of the second outer electrodes 2 are disposed on the first side surface 17a and the second side surface 17b that are opposite to each other.

Here, a direction in which the two first outer electrodes 1 are opposite to each other is defined as the length direction L of the multilayer ceramic capacitor 10, and a direction in which first inner electrodes 13a and second inner electrodes 13b, which are inner electrodes 13 described later, are stacked is defined as the stacking direction T, and a direction perpendicular or substantially perpendicular to the length direction L and the stacking direction T is defined as the width direction W.

Regarding the size of the multilayer ceramic capacitor 10, for example, a dimension in the length direction L is preferably no less than about 0.2 mm and no more than about 3.2 mm, a dimension in the width direction W is no less than about 0.1 mm and no more than about 1.6 mm, and a dimension in the stacking direction T is no less than about 0.1 mm and no more than about 1.6 mm. The dimensions may have a tolerance of about +10%. The relationship of magnitude among the dimension in the width direction W, the dimension in the length direction L, and the dimension in the stacking direction T of the multilayer ceramic capacitor 10 does not depend on the relationship of magnitude of the dimensions according to the preferred embodiment. For example, the dimension in the width direction W may be larger than the dimension in the length direction L.

The multilayer body 11 includes rounded corner portions and rounded ridge portions. Three surfaces of the multilayer body 11 intersect each other at the corner portions. Two surfaces of the multilayer body 11 intersect each other along the ridge portions.

As shown in FIG. 2 and FIG. 3, the multilayer body 11 includes an inner layer portion 21, outer layer portions 22, and margin portions 23.

The inner layer portion 21 includes dielectric layers 12, the first inner electrodes 13a, and the second inner electrodes 13b. The dielectric layers 12, the first inner electrodes 13a, and the second inner electrodes 13b extend in the width direction W and the length direction L.

The dielectric layers 12 are interposed between the first inner electrodes 13a and the second inner electrodes 13b. The first inner electrodes 13a and the second inner electrodes 13b are alternately stacked with the dielectric layers 12 interposed therebetween, and consequently, the inner layer portion 21 is defined.

Each dielectric layer 12 preferably includes, for example, dielectric ceramic particles each of which has a perovskite structure and includes a perovskite compound including Ba and Ti as a main component. The main component may include an additive of at least one of Si, Mg, Mn, or Ba, for example. The dielectric layer 12 may include a rare-earth element such as Dy, Y, or Ho, for example. The thickness of the dielectric layer 12 is preferably, for example, no less than about 0.3 μm and no more than about 1.0 μm.

The first inner electrodes 13a and the second inner electrodes 13b face each other in the stacking direction T with the dielectric layers 12 interposed therebetween. An electrostatic capacity is generated in regions in which the first inner electrodes 13a and the second inner electrodes 13b face each other with the dielectric layers 12 interposed therebetween.

Figure 4A:
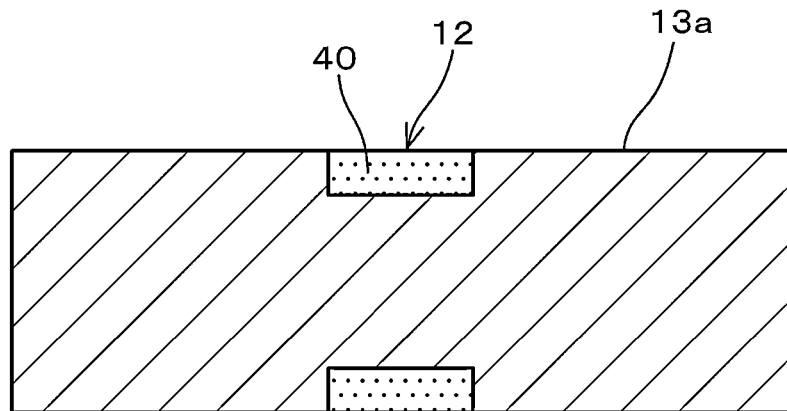
FIG. 4A is a plan view of a first inner electrode and a dielectric layer.
Figure 4B:
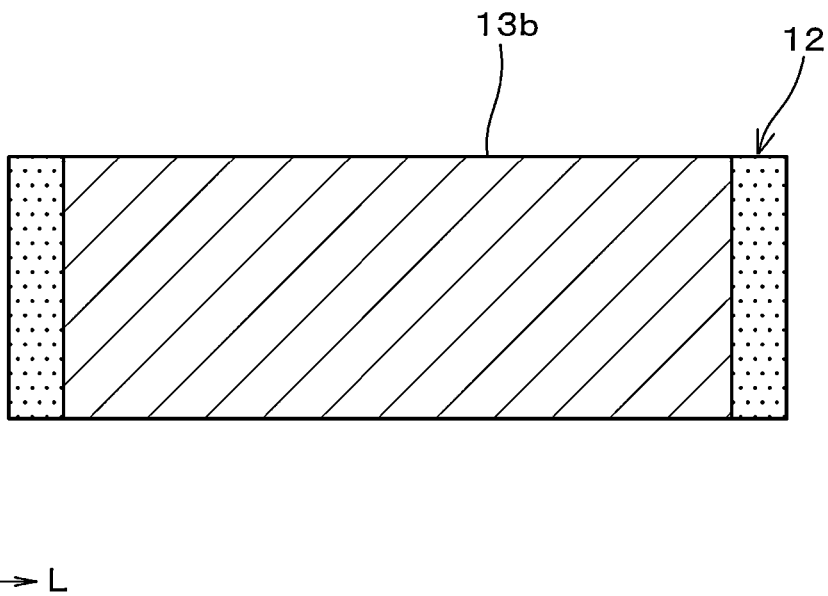
FIG. 4B is a plan view of a second inner electrode and a dielectric layer.

FIG. 4A is a plan view of one of the dielectric layers 12 on which the corresponding first inner electrode 13a is provided. FIG. 4B is a plan view of one of the dielectric layers 12 on which the corresponding second inner electrode 13b is provided.

As shown in FIG. 4A, each first inner electrode 13a includes notches 40 at central portions in the length direction L and along both of edges in the width direction W. That is, the first inner electrode 13a has a size smaller than that of each dielectric layer 12 due to the notches 40.

The first inner electrodes 13a extend in the length direction L to the first end surface 15a and the second end surface 15b of the multilayer body 11. The first inner electrodes 13a extend in the width direction W and are in contact with the margin portions 23 described later except for the notches 40.

The second inner electrodes 13b are not in contact with the first end surface 15a and the second end surface 15b on which the first outer electrodes 1 are disposed. That is, as shown in FIG. 4B, the second inner electrodes 13b extend in the width direction W and are in contact with the margin portions 23 described later but do not extend in the length direction L to the first end surface 15a and the second end surface 15b of the multilayer body 11. Accordingly, when the size of each dielectric layer 12 is considered as a standard, end portions of the second inner electrodes 13b in the length direction L are located a predetermined distance inward from the first end surface 15a and the second end surface 15b in the length direction L.

The second inner electrodes 13b are connected to the second outer electrodes 2 that are disposed on the first side surface 17a and the second side surface 17b of the multilayer body 11 as described later but include no extended portions that protrude in the width direction W for connection to the second outer electrodes 2 as shown in FIG. 4B. As shown in FIGS. 4A and 4B, the maximum dimension of each second inner electrode 13b in the width direction W is preferably equal or substantially equal to the maximum dimension of each first inner electrode 13a in the width direction W.

The first inner electrodes 13a and the second inner electrodes 13b preferably include, for example, Ni. The first inner electrodes 13a and the second inner electrodes 13b may include, for example, a metal such as Cu, Ag, Pd, an Ag—Pd alloy, or Au other than Ni. The first inner electrodes 13a and the second inner electrodes 13b preferably include, for example, a common material that is the same or substantially the same dielectric material as dielectric ceramics that is included in the dielectric layers 12.

The first inner electrodes 13a and the second inner electrodes 13b preferably include, for example, Si and Ti. The mole ratio of Si to Ti included in end portions, in the width direction W, of the second inner electrodes 13b that have a uniform dimension in the width direction W is larger than that in central portions of the second inner electrodes 13b in the width direction W. That is, Si is segregated in the end portions of the second inner electrodes 13b in the width direction W. Similarly, Si is segregated in end portions of the first inner electrodes 13a in the width direction W.

The amounts of Ti and Si that are included in the second inner electrodes 13b can be obtained, for example, by a wave-length-dispersive X-ray spectroscopy (WDX) after the multilayer ceramic capacitor 10 is polished to expose the second inner electrodes 13b.

The number of the inner electrodes 13 that are stacked and that include the first inner electrodes 13a and the second inner electrodes 13b is preferably, for example, no less than 20 and no more than 500. The thickness of each of the first inner electrodes 13a and the second inner electrodes 13b is preferably, for example, no less than about 0.1 μm and no more than about 0.8 μm.

According to the present preferred embodiment, as shown in FIG. 3, the end portions of the inner electrodes 13 are aligned in the stacking direction when a section of the multilayer ceramic capacitor 10 having the width direction W and the stacking direction T is viewed in the length direction L. That is, the dimensions of the inner electrodes 13 in the width direction W are equal or substantially equal to each other.

Figure 5:
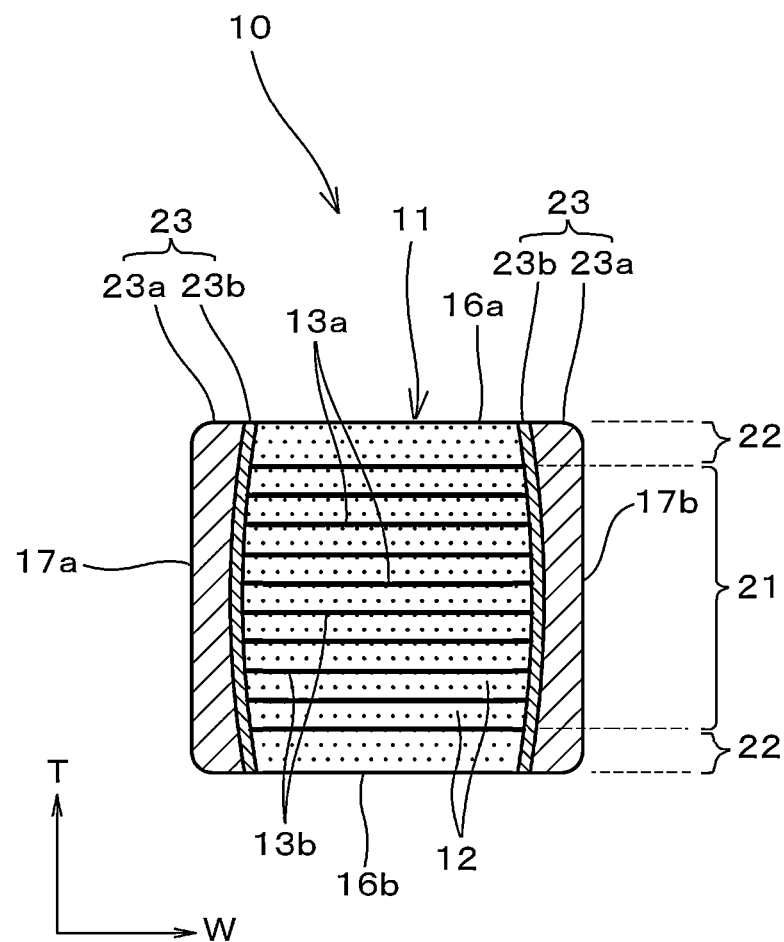
FIG. 5 is a sectional view of the multilayer ceramic capacitor that has a structure in which end portions, in the width direction, of an inner electrode that is located at a central portion in a stacking direction protrude outward more than end portions of other inner electrodes at outer portions in the stacking direction.

As shown in FIG. 5, the end portions of the inner electrode 13 in the width direction W at a central portion in the stacking direction T may protrude outward more than the end portions at outer portions in the stacking direction T. In other words, the dimensions, in the width direction W, of the inner electrodes 13 that are located at the outer portions in the stacking direction T are smaller than the dimension, in the width direction W, of the inner electrode 13 that is located at the central portion in the stacking direction T. A decrease in the dimensions, in the width direction W, of the inner electrodes 13 that are located at the outer portions in the stacking direction T enables distances from the ridge portions to the inner electrodes to be increased, and humidity resistance against water that enters from the ridge portions can be significantly improved.

For example, the dimensions of the inner electrodes 13 in the width direction W can be measured by the following method. A surface of the multilayer ceramic capacitor 10 having the width direction W and the stacking direction T is first exposed. In the following description, the surface having the width direction W and the stacking direction T is referred to as a WT section. Subsequently, the WT section is imaged with an optical microscope. The dimension, in the width direction W, of the inner electrode 13 that is located at the central portion in the stacking direction T and the dimensions, in the width direction W, of the inner electrodes 13 that are located at the outer portions in the stacking direction T are measured. The dimension, in the width direction W, of the inner electrode 13 that is located at the central portion in the stacking direction T and the dimensions, in the width direction W, of the inner electrodes 13 that are located at the outer portions in the stacking direction T are measured by calculating average values of measured values at three positions of the position of a central portion of the multilayer ceramic capacitor 10 in the length direction L, a position nearer than the central portion to the first end surface 15a, and a position nearer than the central portion to the second end surface 15b.

The outer layer portions 22 are disposed on both of the outsides of the inner layer portion 21 in the stacking direction T. That is, the inner layer portion 21 is interposed between the two outer layer portions 22 that are disposed on both of the outsides in the stacking direction T. In the outer layer portions 22, the first inner electrodes 13a and the second inner electrodes 13b are not present except for the margin portions 23 described later when a section of the multilayer body 11 having the stacking direction T and the width direction W is viewed in the length direction L.

Each outer layer portion 22 includes a dielectric body including, for example, the same or substantially the same material as that of the dielectric layers 12. A different dielectric material is also acceptable. The dimension of the outer layer portion 22 in the stacking direction T is preferably, for example, about 10 μm or more.

In the margin portions 23, the first inner electrodes 13a and the second inner electrodes 13b are not present when a section of the multilayer body 11 having the length direction L and the width direction W is viewed in the stacking direction T. As shown in FIG. 3, the margin portions 23 are located on both of the outsides in the width direction W. That is, the inner layer portion 21 and the outer layer portions 22 are located between the two margin portions 23, which are provided at both of the outsides of the inner layer portion 21 and the outer layer portions 22 in the width direction W. According to the present preferred embodiment, the margin portions 23 are located on both of the outsides in the width direction W but may be disposed on both of the outsides in the length direction L, that is, near the first end surface 15a and the second end surface 15b.

According to the present preferred embodiment, each margin portion 23 includes margin layers that are stacked in the width direction W. Specifically, the margin portion 23 includes an outer margin layer 23a and an inner margin layer 23b. The outer margin layer 23a is located near the first side surface 17a or the second side surface 17b of the multilayer body 11. The inner margin layer 23b is located near the inner layer portion 21, that is, at a position nearer than the outer margin layer 23a to the inside in the width direction W.

When each margin portion 23 includes the margin layers 23a and 23b, boundaries therebetween can be readily checked by observing differences in sinterability between the outer margin layer 23a and the inner margin layer 23b with an optical microscope. That is, there is a boundary line between the outer margin layer 23a and the inner margin layer 23b.

The dimension of each margin portion 23 in the width direction W is preferably, for example, no less than about 5 μm and no more than about 100 μm. According to the present preferred embodiment, the dimension of the outer margin layer 23a in the width direction W is larger than the dimension of the inner margin layer 23b in the width direction W.

The dimension of each margin portion 23 in the width direction W refers to an average dimension that is calculated on the basis of measured values of the dimension of the margin portion 23 at positions in the stacking direction T. A method of measuring the dimension of the margin portion 23 in the width direction W is as follows.

A WT section of the multilayer ceramic capacitor 10 having the width direction W and the stacking direction T is first exposed. Subsequently, an optical microscope images with the end portions of the first inner electrodes 13a and the second inner electrodes 13b in the width direction W in the WT section within the same or substantially the same field of view as a corresponding one of the two margin portions 23 that are located on both of the outsides in the width direction W. Three portions of an upper portion, a central portion, and a lower portion in the stacking direction T are imaged. Parallel lines in the width direction W are drawn on the upper portion, the central portion, and the lower portion from the end portions of the first inner electrodes 13a and the second inner electrodes 13b in the width direction W toward the first side surface 17a or the second side surface 17b, and the lengths of the lines are measured. The average values of the measured lengths of the lines are calculated for the upper portion, the central portion, and the lower portion. The average values are averaged to obtain the dimension of the margin portion 23 in the width direction W.

Each margin portion 23 includes a dielectric body preferably including, for example, a dielectric ceramic material that includes $BaTiO_3$ as a main component and that has a perovskite structure. The main component preferably includes an additive of Si, for example.

The average particle diameter of the dielectric particles that are included in the dielectric layers 12 that are interposed between the first inner electrodes 13a and the second inner electrodes 13b is larger than the average particle diameter of the dielectric particles that are included in the margin portions 23. The average particle diameter of the dielectric particles in a central portion of the multilayer body 11 in the width direction W and the stacking direction T is compared with the average particle diameter of the dielectric particles in central portions of the margin portions 23 in the width direction W and the stacking direction T after the multilayer body 11 is polished up to a central portion in the length direction L. The average particle diameter of the dielectric particles is calculated by imaging the exposed section with the settings of the SEM including a magnification of 5000, an acceleration voltage of about 15 kV, and a field of view of about 30 μm×about 30 μm, the circumferences of all of the dielectric particles are recognized by image-processing software to calculate an area, and the area is regarded as the area of a circle. The diameters of all of the dielectric particles that are within the range of the image except for a dielectric particle that is partially imaged are measured. The average value thereof is determined to be the average particle diameter of the dielectric particles.

The outer margin layer 23a includes Si in an amount larger than that in the inner margin layer 23b. That is, the mole ratio of Si to Ti in the outer margin layer 23a is higher than the mole ratio of Si to Ti in the inner margin layer 23b. For example, the mole ratio of Si to Ti in the outer margin layer 23a is preferably no less than about 3.5 and no more than about 6.0. The mole ratio of Si to Ti in the inner margin layer is preferably no less than about 0.02 and no more than about 3.5. The mole ratio can be measured by WDX analysis or a TEM.

Since Si acts as a sintering additive, the outer margin layer 23a that is obtained by firing when the multilayer ceramic capacitor 10 is manufactured has a finer structure than that of the inner margin layer 23b. Accordingly, the strength of the margin portions 23 is able to be increased. Accordingly, the margin portions 23 are unlikely to crack and chip, and water is prevented from entering the inside.

The margin portions 23 can be formed, for example, by manufacturing a multilayer body chip that is to be the inner layer portion 21 and the outer layer portions 22 after firing, and ceramic green sheets are subsequently attached to both of side surfaces of the multilayer body chip and fired. Ceramic slurry that is to be the ceramic green sheets may be applied to both of the side surfaces.

The first outer electrodes 1 are disposed on the first end surface 15a and the second end surface 15b of the multilayer body 11. The first outer electrode 1 that is disposed near the first end surface 15a is disposed on the entire or substantially the entire first end surface 15a and extends from the first end surface 15a along the first main surface 16a, the second main surface 16b, the first side surface 17a, and the second side surface 17b. The first outer electrode 1 that is disposed near the second end surface 15b is disposed on the entire or substantially the entire second end surface 15b and extends from the second end surface 15b along the first main surface 16a, the second main surface 16b, the first side surface 17a, and the second side surface 17b.

Figure 6A:
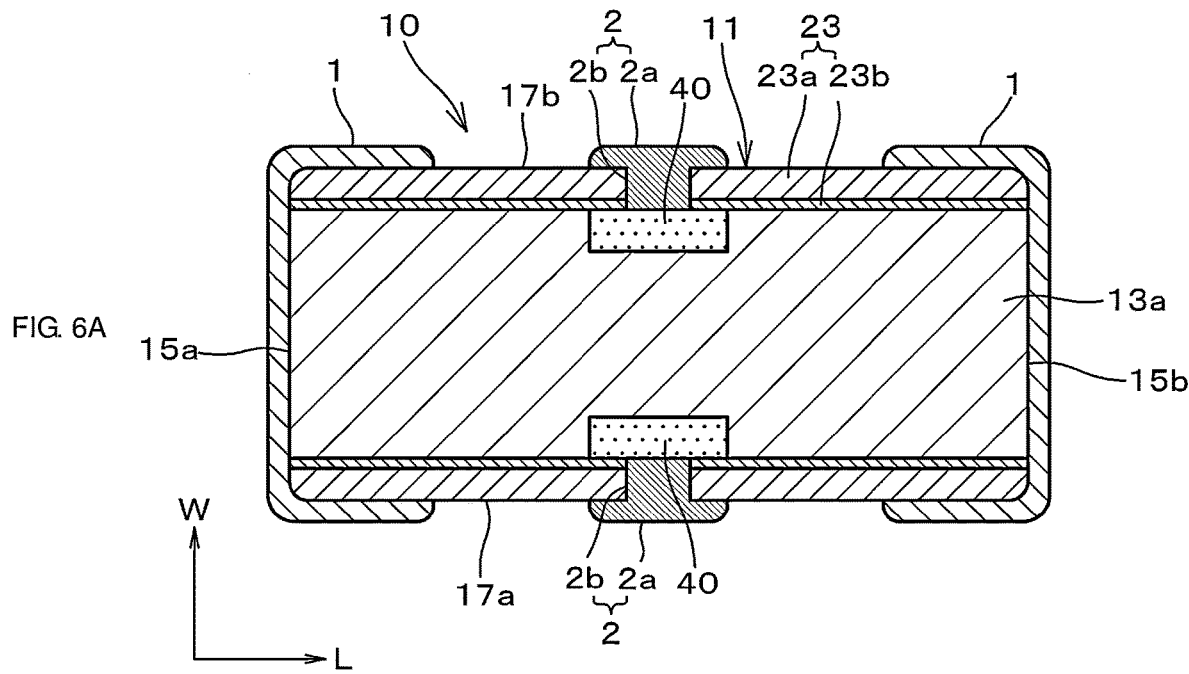
FIG. 6A is a sectional view of the multilayer ceramic capacitor taken along a plane including a first inner electrode.
Figure 6B:
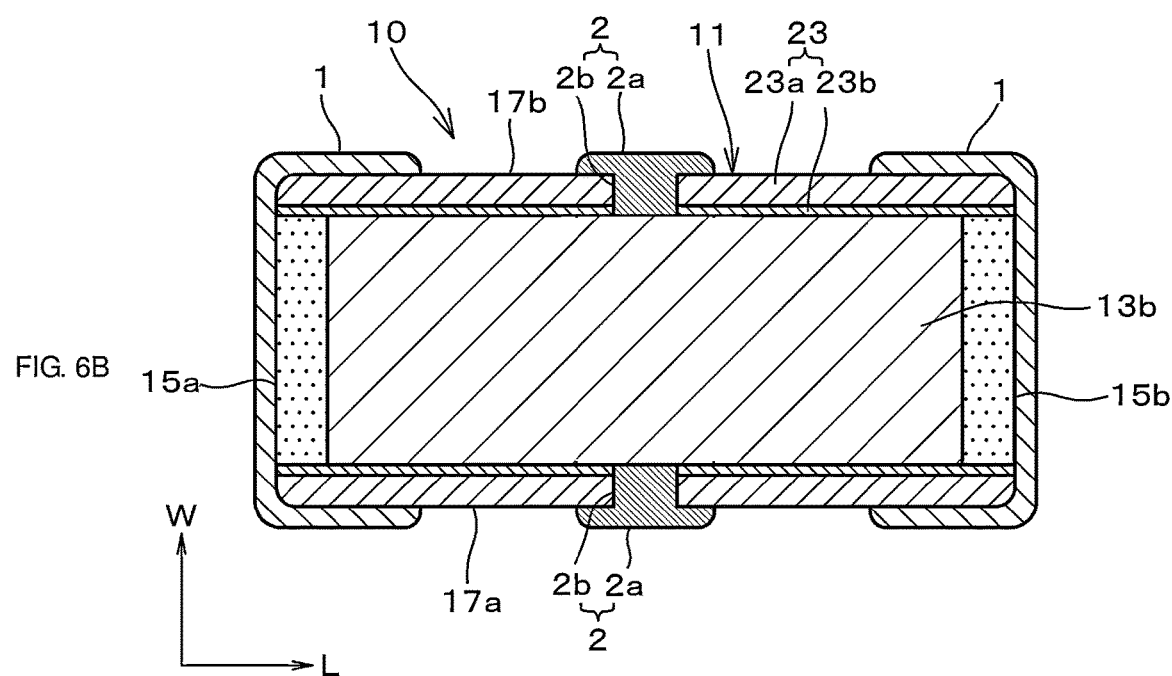
FIG. 6B is a sectional view thereof taken along a plane including a second inner electrode.

FIG. 6A is a sectional view of the multilayer ceramic capacitor 10 taken along a plane including one of the first inner electrodes 13a. FIG. 6B is a sectional view thereof taken along a plane including one of the second inner electrodes 13b.

As shown in FIG. 6A, the first outer electrodes 1 are directly connected to the first inner electrodes 13a along the first end surface 15a and the second end surface 15b of the multilayer body 11 and are electrically connected to the first inner electrodes 13a. As shown in FIG. 6B, the first outer electrodes 1 are not electrically connected to the second inner electrodes 13b.

In the specification, the outer electrodes being directly connected to the inner electrodes indicates that the outer electrodes and the inner electrodes are connected to each other with the outer electrodes and the inner electrodes being in contact with each other.

Each first outer electrode 1 preferably includes a metal such as, for example, Ni, Cu, Ag, Pd, an Ag—Pd alloy, or Au. The first outer electrode 1 preferably includes, for example, the common material that is the same or substantially the same dielectric material as the dielectric ceramics that is included in the dielectric layers 12. The common material provides a behavior of shrinkage of the first outer electrode 1 during firing that is the same as, or similar to, a behavior of shrinkage of the multilayer body 11 and prevents the first outer electrode 1 from being separated from the multilayer body 11.

The second outer electrodes 2 are disposed on the first side surface 17a and the second side surface 17b of the multilayer body 11. The second outer electrode 2 that is disposed near the first side surface 17a is disposed on a central portion of the first side surface 17a in the length direction L and extends from the first side surface 17a along the first main surface 16a and the second main surface 16b. The second outer electrode 2 that is disposed near the second side surface 17b is disposed on a central portion of the second side surface 17b in the length direction L and extends from the second side surface 17b along the first main surface 16a and the second main surface 16b.

The positions of the second outer electrodes 2 that are disposed on the first side surface 17a and the second side surface 17b are not limited to the positions of the central portions in the length direction L.

As shown in FIGS. 6A and 6B, the second outer electrodes 2 that are disposed on the first side surface 17a and the second side surface 17b of the multilayer body 11 include respective surface portions 2a that are located on the surfaces of the multilayer body 11 and respective through sections 2b that extend through the margin portions 23. As shown in FIG. 6B, the through sections 2b are located between the first side surface 17a or the second side surface 17b of the multilayer body 11 and the end portions of the second inner electrodes 13b in the width direction W. The second outer electrodes 2 are directly connected to the second inner electrodes 13b at positions spaced away from the first side surface 17a and the second side surface 17b toward the inside of the multilayer body 11 by the through sections 2b and are electrically connected to the second inner electrodes 13b. Each through section 2b has a size of at least about 10 μm or more. At least the through sections that are connected to the corresponding second inner electrodes 13b face each other in the stacking direction.

Each first inner electrode 13a includes the notches 40 on the central portion in the length direction L and along both of the edges in the width direction W, as described above. The notches 40 overlap connections between the second inner electrodes 13b and the second outer electrodes 2 in the stacking direction T. As shown in FIG. 6A, both ends of the notches 40 in the length direction L are located nearer than both ends of the through sections 2b of the second outer electrodes 2 in the length direction L to the outside. With this structure, the second outer electrodes 2 are not electrically connected to the first inner electrodes 13a.

Figure 7:
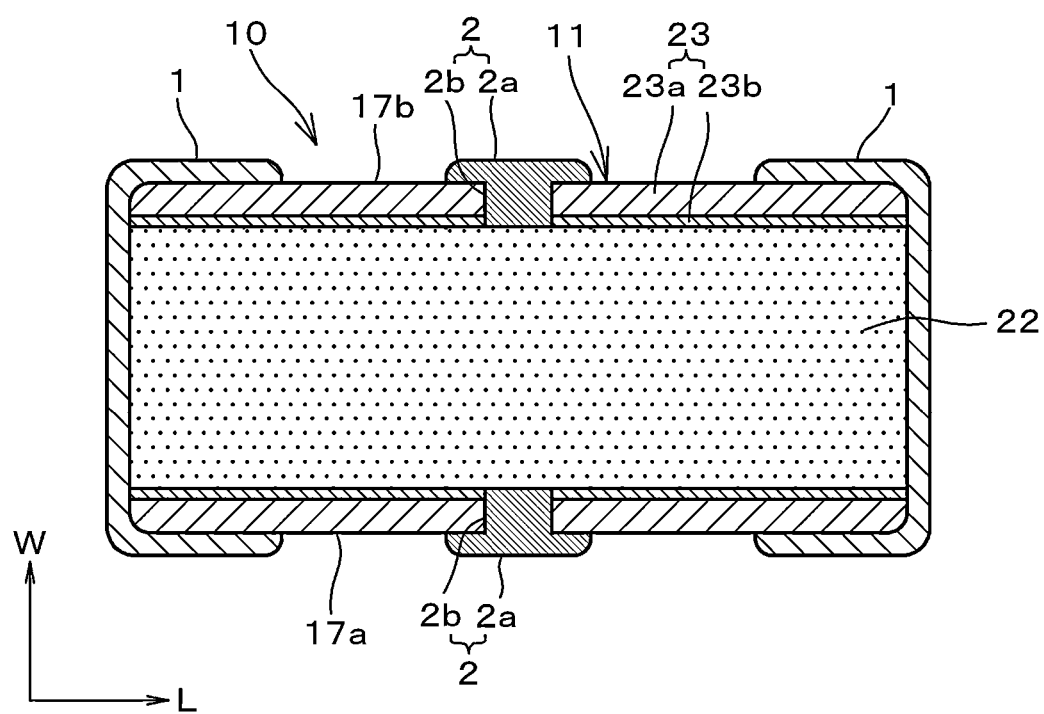
FIG. 7 is a sectional view of the multilayer ceramic capacitor taken along a plane including an outer layer portion.

FIG. 7 is a sectional view of the multilayer ceramic capacitor 10 taken along a plane including one of the outer layer portions 22. As shown in FIG. 7, the second outer electrodes 2 include the through sections 2b that extend through the margin portions 23 not only at height positions in the stacking direction T at which the second inner electrodes 13b are disposed, but also at height positions at which the second inner electrodes 13b are not disposed but the outer layer portions 22 are disposed.

That is, the through sections 2b of the second outer electrodes 2 extend through the margin portions 23 from the first main surface 16a of the multilayer body 11 to the second main surface 16b when viewed in the stacking direction T.

Each second outer electrode 2 preferably includes a metal such as, for example, Ni, Cu, Ag, Pd, an Ag—Pd alloy, or Au. The second outer electrode 2 preferably includes, for example, the common material that is the same or substantially the same ceramic material as the dielectric ceramics that is included in the dielectric layers 12. The common material provides a behavior of shrinkage of the second outer electrode 2 during firing that is the same as, or similar to, a behavior of shrinkage of the multilayer body 11 and prevents the second outer electrode 2 from being separated from the multilayer body 11.

The first outer electrodes 1 and the second outer electrodes 2 can be formed, for example, by being simultaneously fired together with the first inner electrodes 13a and the second inner electrodes 13b, that is, by co-firing. In this case, the first outer electrodes 1 and the second outer electrodes 2 each have a structure that is formed by being simultaneously fired.

In the case of formation by co-firing, for example, the first inner electrodes 13a and the second inner electrodes 13b can include Ni, and the first outer electrodes 1 and the second outer electrodes 2 can also include Ni. The formation by co-firing increases the strength of joints between the first inner electrodes 13a and the first outer electrodes 1 and increases the strength of joints between the second inner electrodes 13b and the second outer electrodes 2.

In the case where the first outer electrodes 1 and the second outer electrodes 2 are formed by co-firing, the amount of the common material that is included in the first outer electrodes 1 and the second outer electrodes 2 is preferably, for example, larger than the amount of the common material that is included in the first inner electrodes 13a and the second inner electrodes 13b in order to increase the strength of the joints between the first outer electrodes 1 and the multilayer body 11 and between the second outer electrodes 2 and the multilayer body 11. For example, the amount of the common material that is included in the first outer electrodes 1 and the second outer electrodes 2 by wt % is preferably, for example, equal to or more than about 3 times the amount of the common material that is included in the first inner electrodes 13a and the second inner electrodes 13b.

The kind of elements that are included in the first outer electrodes 1 and the second outer electrodes 2 can be checked by transmission electron microscope-energy-dispersive X-ray spectroscopy (TEM-EDX) elemental analysis.

In the case where the first outer electrodes 1 and the second outer electrodes 2 are formed as Ni layers, the content of a ceramic material in each Ni layer is preferably, for example, no less than about 25 area % and no more than about 40 area %. The content of the ceramic material in the Ni layer being about 25 area % or more indicates that the ceramic material is included in a predetermined amount or more in the Ni layer. The outer electrodes 1 and 2 that include the corresponding Ni layer that include the ceramic material in a predetermined amount or more can be formed by simultaneously firing outer electrode paste when the multilayer body is fired. The content of the ceramic material in the Ni layer is more preferably, for example, about 40 area % or less.

The content of the ceramic material in each Ni layer is measured by the following method with the wave-length-dispersive X-ray spectroscopy (WDX). A section of a central portion of the multilayer ceramic capacitor 10 in the width direction W is first exposed. A central portion of the Ni layer in the thickness direction in a central portion of the multilayer body 11 in the stacking direction T is enlarged to 10000 times. The field of view of an enlarged region has a range of about 6 μm×about 8 μm. The enlarged region is mapped by WDX. An area ratio is measured from an image that is obtained by mapping.

Each first outer electrode 1 preferably, for example, includes a Ni layer 1d, a first plating layer 1e, a second plating layer 1f, and a third plating layer 1g that are provided in this order from a position near the first end surface 15a or the second end surface 15b of the multilayer body 11. Similarly, each second outer electrode 2 preferably includes, for example, a Ni layer 2d, a first plating layer 2e, a second plating layer 2f, and a third plating layer 2g in this order from a position near the first side surface 17a or the second side surface 17b of the multilayer body 11. The first plating layers 1e and 2e are preferably formed, for example, by Cu plating. The second plating layers 1f and 2f are preferably formed, for example, by Ni plating. The third plating layers 1g and 2g are preferably formed, for example, by Sn plating. Only the second plating layers 1f and 2f and the third plating layers 1g and 2g suffice. The first outer electrode 1 may include a conductive resin layer that includes conductive particles and resin between the Ni layer 1d and the first plating layer 1e. Similarly, the second outer electrode 2 may include a conductive resin layer that includes conductive particles and resin between the Ni layer 2d and the first plating layer 2e. Examples of the conductive particles include metal particles such as Cu particles, Ag particles, and Ni particles.

In the case where the second outer electrodes 2 are formed by co-firing, the boundaries between the second outer electrodes 2 and the second inner electrodes 13b can be checked by checking the amounts of the common materials that are included therein because the amount of the common material that is included in the second outer electrodes 2 differs from the amount of the common material that is included in the second inner electrodes 13b. In addition, whether the second inner electrodes 13b protrude outward in the width direction W and are connected to the second outer electrodes 2, or whether the second outer electrodes 2 extend inward in the width direction W and are connected to the second inner electrodes 13b can be grasped by checking the boundaries between the second outer electrodes 2 and the second inner electrodes 13b.

The first outer electrodes 1 and the second outer electrodes 2 can also be formed by firing conductive paste that is applied to the multilayer body 11, that is, by post-firing. In the case where the first outer electrodes 1 and the second outer electrodes 2 are formed by post-firing, the first outer electrodes 1 and the second outer electrodes 2 preferably includes glass in a larger amount than those in the first inner electrodes 13a and the second inner electrodes 13b. Accordingly, the boundaries between the second outer electrodes 2 and the second inner electrodes 13b can be checked by checking the amounts of glass included in the second outer electrodes 2 and the second inner electrodes 13b. In addition, whether the second inner electrodes 13b protrude outward in the width direction W and are connected to the second outer electrodes 2, or whether the second outer electrodes 2 extend inward in the width direction W and are connected to the second inner electrodes 13b can be grasped by checking the boundaries between the second outer electrodes 2 and the second inner electrodes 13b.

The outer electrode paste that forms the first outer electrodes 1 and the second outer electrodes 2 is preferably applied, for example, by a roller in order to inhibit air to enter the inside.

In the multilayer ceramic capacitor 10 according to the present preferred embodiment, the second outer electrodes 2 that are disposed on the first side surface 17a and the second side surface 17b of the multilayer body 11 are directly connected to the second inner electrodes 13b at positions spaced away from the first side surface 17a and the second side surface 17b toward the inside of the multilayer body 11 as described above. That is, it is not necessary for the second inner electrodes 13b to include extended portions that protrude in the width direction W for connection to the second outer electrodes 2. Accordingly, effective regions in which the first inner electrodes 13a and the second inner electrodes 13b overlap in the stacking direction T can be enlarged, and the electrostatic capacity per volume can be increased.

With the above structure, each margin portion 23 protects the effective regions in the width direction W, and the dimension of the margin portion 23 in the width direction can be decreased. Accordingly, the size of the multilayer ceramic capacitor 10 can be decreased, and the ESL of the multilayer ceramic capacitor 10 can be decreased.

In particular, the second outer electrodes 2 of the multilayer ceramic capacitor 10 according to the present preferred embodiment include the through sections 2b that extend through the margin portions 23 and are directly connected to the second inner electrodes 13b by the through sections 2b. With this structure, the second inner electrodes 13b include no extended portions that protrude in the width direction W for connection to the second outer electrodes 2, and the second inner electrodes 13b and the second outer electrodes 2 can be connected to each other.

In a multilayer ceramic capacitor that corresponds to an electronic component according to a preferred embodiment of the present invention, at least one of outer electrodes is disposed on at least one of a first side surface or a second side surface of a multilayer body and is directly connected to inner electrodes at positions spaced away from the at least one of the first side surface or the second side surface toward the inside of the multilayer body. The multilayer ceramic capacitor 10 according to the preferred embodiment described above is an example of the multilayer ceramic capacitor that has such a structure. Another example of the multilayer ceramic capacitor that has the structure of an electronic component according to the present invention other than the above multilayer ceramic capacitor 10 will be described below.

First Modification

In the above multilayer ceramic capacitor 10 according to the preferred embodiment, the first outer electrodes 1 are disposed on the first end surface 15a and the second end surface 15b, and the second outer electrodes 2 are disposed on the first side surface 17a and the second side surface 17b. However, positions at which the first outer electrodes 1 and the second outer electrodes 2 are disposed are not limited to the above positions. For example, the first outer electrodes 1 and the second outer electrodes 2 may be disposed on only the first side surface 17a and the second side surface 17b of the multilayer body 11.

Figure 8A:
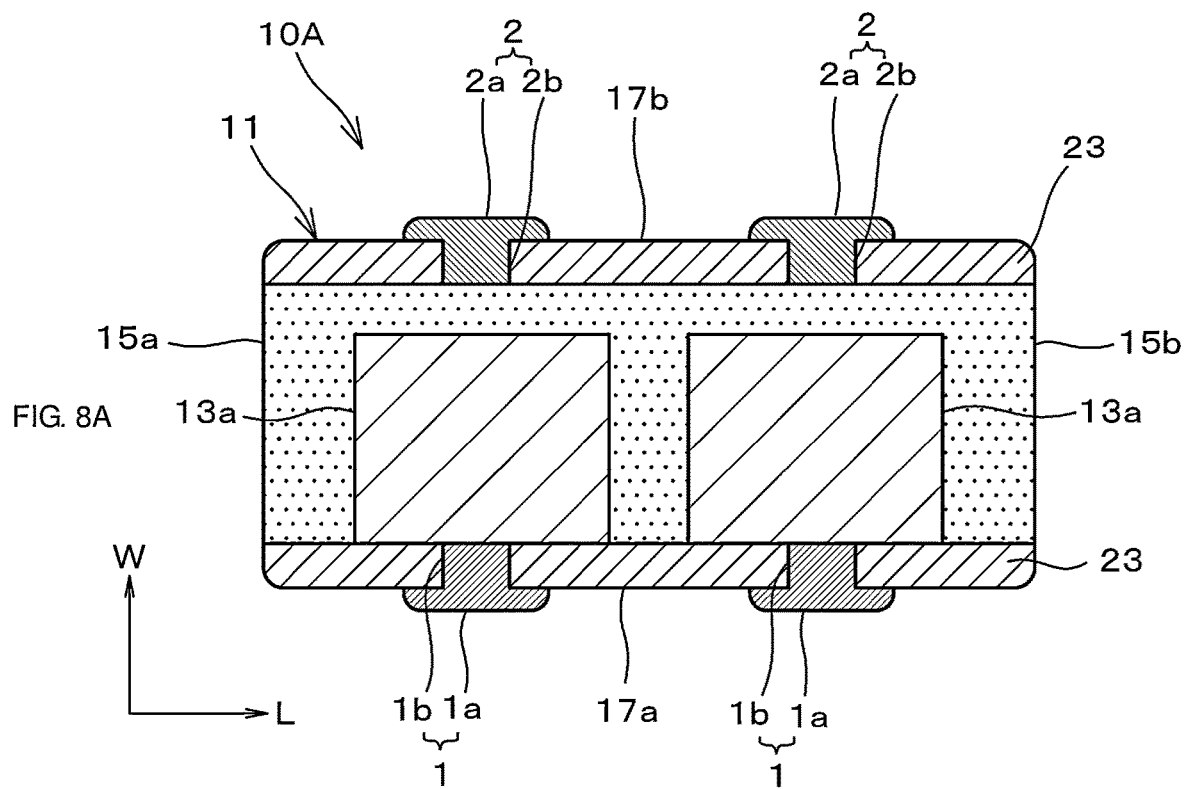
FIG. 8A is a sectional view of a multilayer ceramic capacitor according to a preferred embodiment of the present invention in which two first outer electrodes are disposed on a first side surface of the multilayer body, and two second outer electrodes are disposed on a second side surface, taken along a plane including two first inner electrodes.
Figure 8B:
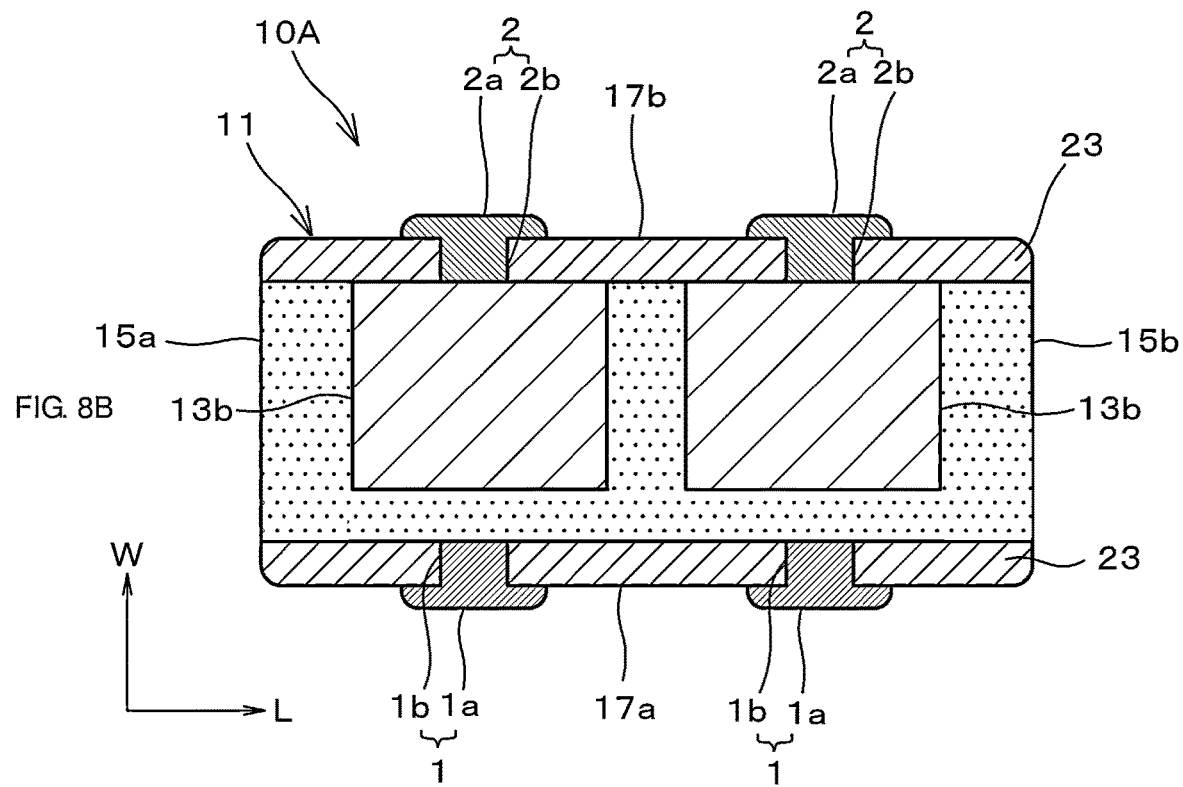
FIG. 8B is a sectional view thereof taken along a plane including two second inner electrodes.

FIG. 8A is a sectional view of a multilayer ceramic capacitor 10A according to a preferred embodiment of the present invention in which two of the first outer electrodes 1 are disposed on the first side surface 17a of the multilayer body 11, and two of the second outer electrodes 2 are disposed on the second side surface 17b, taken along a plane including two of the first inner electrodes 13a. FIG. 8B is a sectional view thereof taken along a plane including two of the second inner electrodes 13b. In FIGS. 8A and 8B, each margin portion 23 is shown as a single layer but may include margin layers.

As shown in FIG. 8A, the first outer electrodes 1 include respective surface portions 1a that are located on the surface of the multilayer body 11 and respective through sections 1b that extend through one of the margin portions 23. The first outer electrodes 1 are connected to the first inner electrodes 13a at the through sections 1b but are not connected to the second inner electrodes 13b as shown in FIG. 8B.

As shown in FIG. 8B, the second outer electrodes 2 include respective surface portions 2a that are located on the surface of the multilayer body 11 and respective through sections 2b that extend through the other margin portion 23. The second outer electrodes 2 are connected to the second inner electrodes 13b at the through sections 2b but are not connected to the first inner electrodes 13a as shown in FIG. 8A.

Also in this case, the first outer electrodes 1 extend through one of the margin portions 23 and are directly connected to the first inner electrodes 13a at positions spaced away from the first side surface 17a toward the inside of the multilayer body 11, and the second outer electrodes 2 extend through the other margin portion 23 and are directly connected to the second inner electrodes 13b at positions spaced away from the second side surface 17b toward the inside of the multilayer body 11. The first inner electrodes 13a include no extended portions that protrude in the width direction W for connection to the first outer electrodes 1. The second inner electrodes 13b include no extended portions that protrude in the width direction W for connection to the second outer electrodes 2.

Second Modification

Figure 9A:
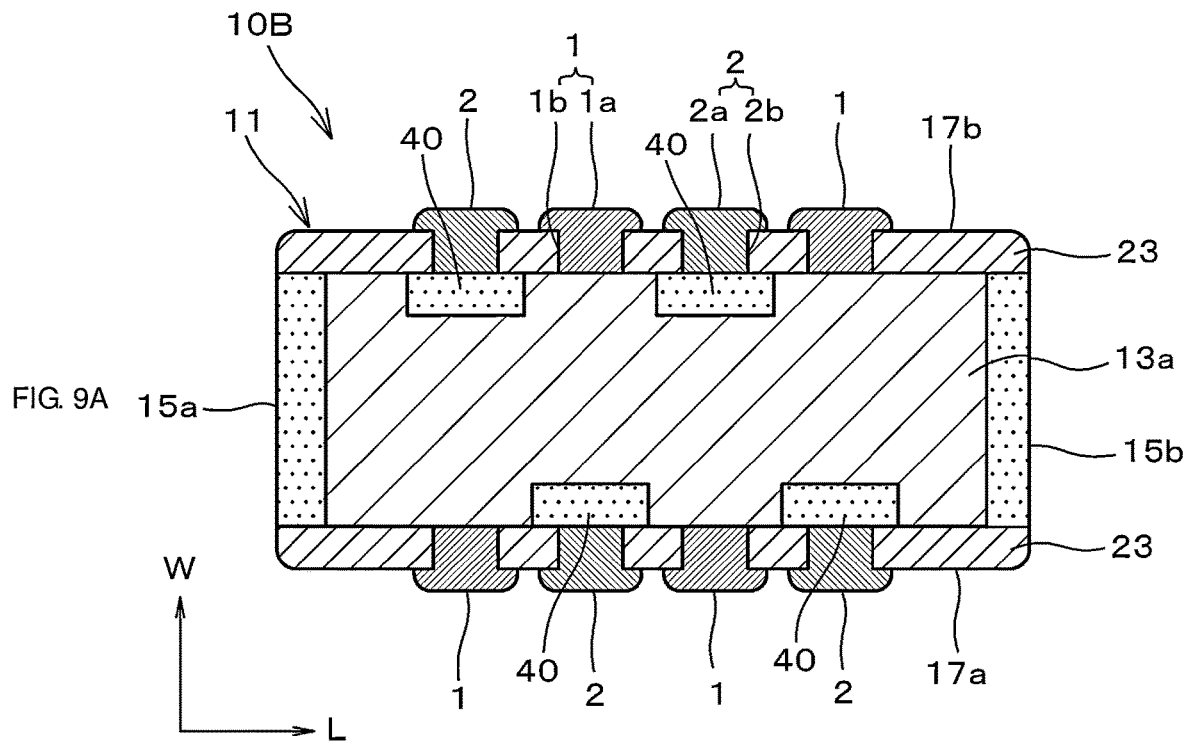
FIG. 9A is a sectional view of a multilayer ceramic capacitor according to a preferred embodiment of the present invention in which two first outer electrodes and two second outer electrodes are disposed on the first side surface, and two first outer electrodes and two second outer electrodes are disposed on the second side surface of the multilayer body, taken along a plane including a first inner electrode.
Figure 9B:
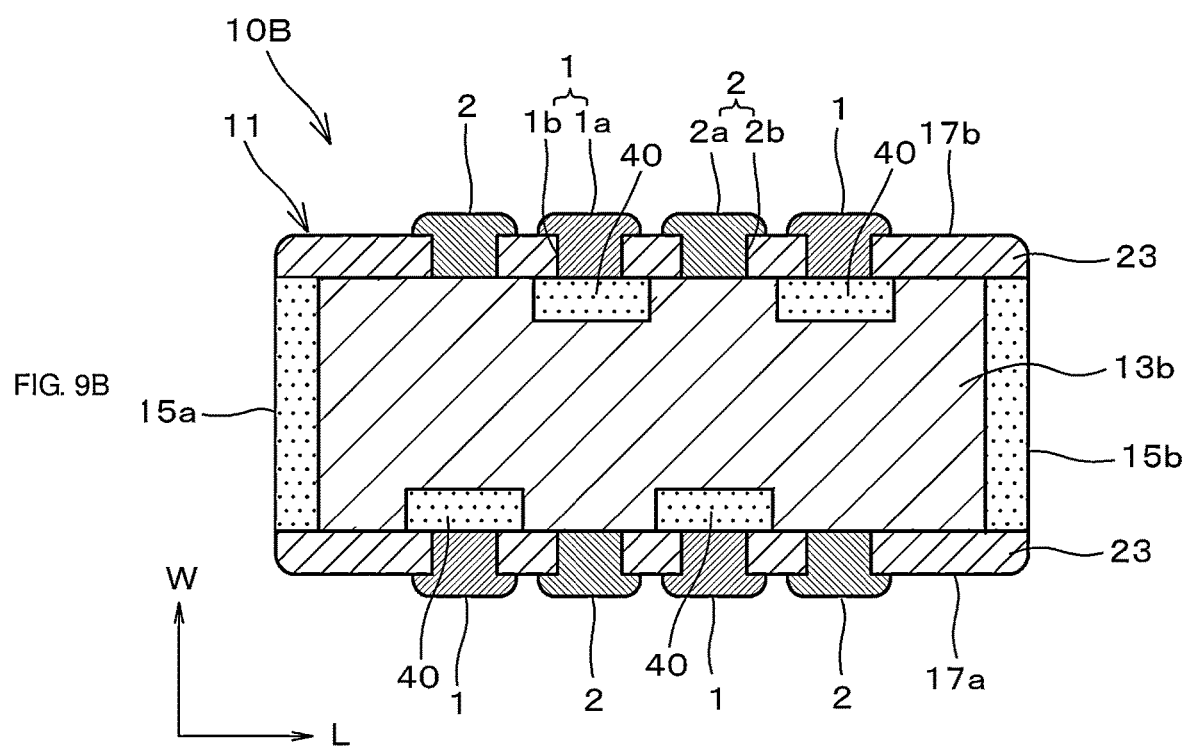
FIG. 9B is a sectional view thereof taken along a plane including a second inner electrode.

FIG. 9A is a sectional view of a multilayer ceramic capacitor 10B according to a preferred embodiment of the present invention in which two of the first outer electrodes 1 and two of the second outer electrodes 2 are disposed on the first side surface 17a and two of the first outer electrodes 1 and two of the second outer electrodes 2 are disposed on the second side surface 17b of the multilayer body 11, taken along a plane including one of the first inner electrodes 13a. FIG. 9B is a sectional view thereof taken along a plane including one of the second inner electrodes 13b. In FIGS. 9A and 9B, each margin portion 23 is shown as a single layer but may include margin layers.

As shown in FIGS. 9A and 9B, the first outer electrodes 1 include the respective surface portions 1a that are located on the surfaces of the multilayer body 11 and the respective through sections 1b that extend through the margin portions 23, and the second outer electrodes 2 include the respective surface portions 2a that are located on the surfaces of the multilayer body 11 and the respective through sections 2b that extend through the margin portions 23.

As shown in FIG. 9A, each first inner electrode 13a has the notches 40 that overlap connections between the second inner electrodes 13b and the second outer electrodes 2 in the stacking direction T. As shown in FIG. 9B, each second inner electrode 13b has the notches 40 that overlap connections between the first inner electrodes 13a and the first outer electrodes 1 in the stacking direction T.

With the above structure, the first outer electrodes 1 are connected to the first inner electrodes 13a as shown in FIG. 9A but are not connected to the second inner electrodes 13b as shown in FIG. 9B. The second outer electrodes 2 are connected to the second inner electrodes 13b as shown in FIG. 9B but are not connected to the first outer electrodes 1 as shown in FIG. 9A.

Also in the multilayer ceramic capacitor 10B shown in FIGS. 9A and 9B, the first inner electrodes 13a include no extended portions that protrude in the width direction W for connection to the first outer electrodes 1, and the second inner electrodes 13b include no extended portions that protrude in the width direction W for connection to the second outer electrodes 2.

Third Modification

Figure 10A:
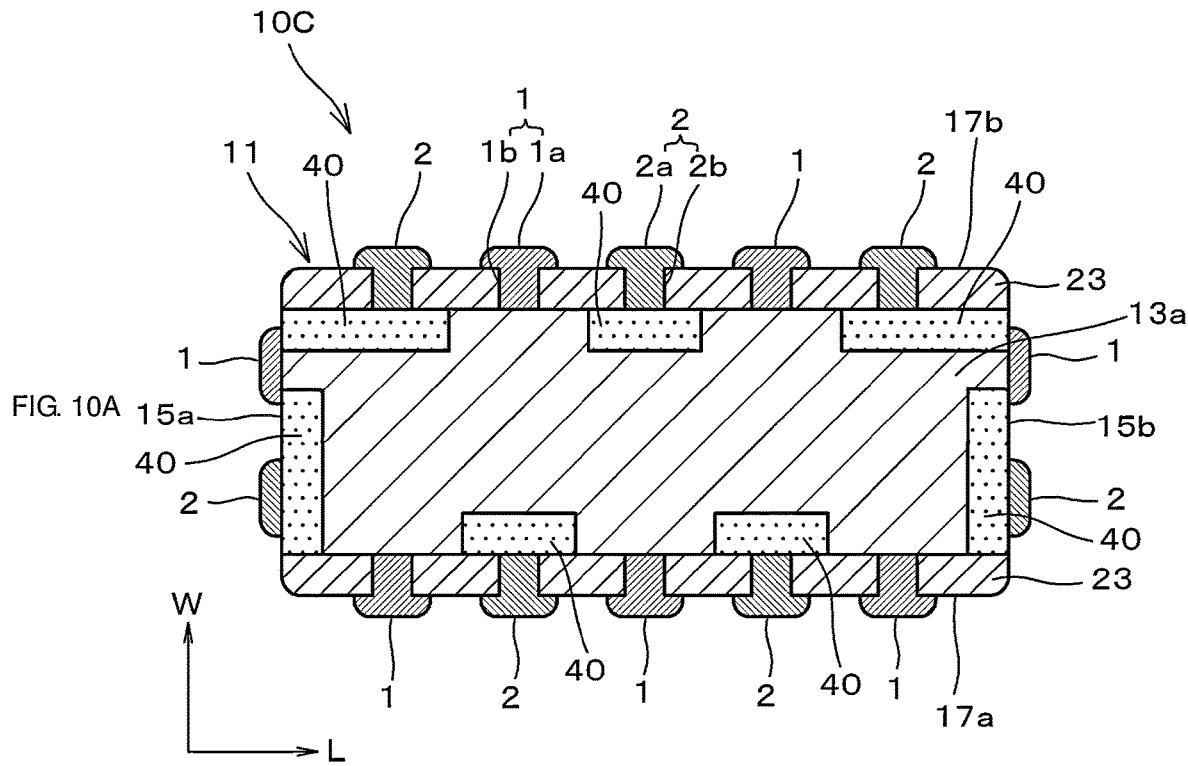
FIG. 10A is a sectional view of a multilayer ceramic capacitor according to a preferred embodiment of the present invention in which first outer electrodes and second outer electrodes are alternately disposed on the first side surface, the second side surface, a first end surface, and a second end surface of the multilayer body, taken along a plane including a first inner electrode.
Figure 10B:
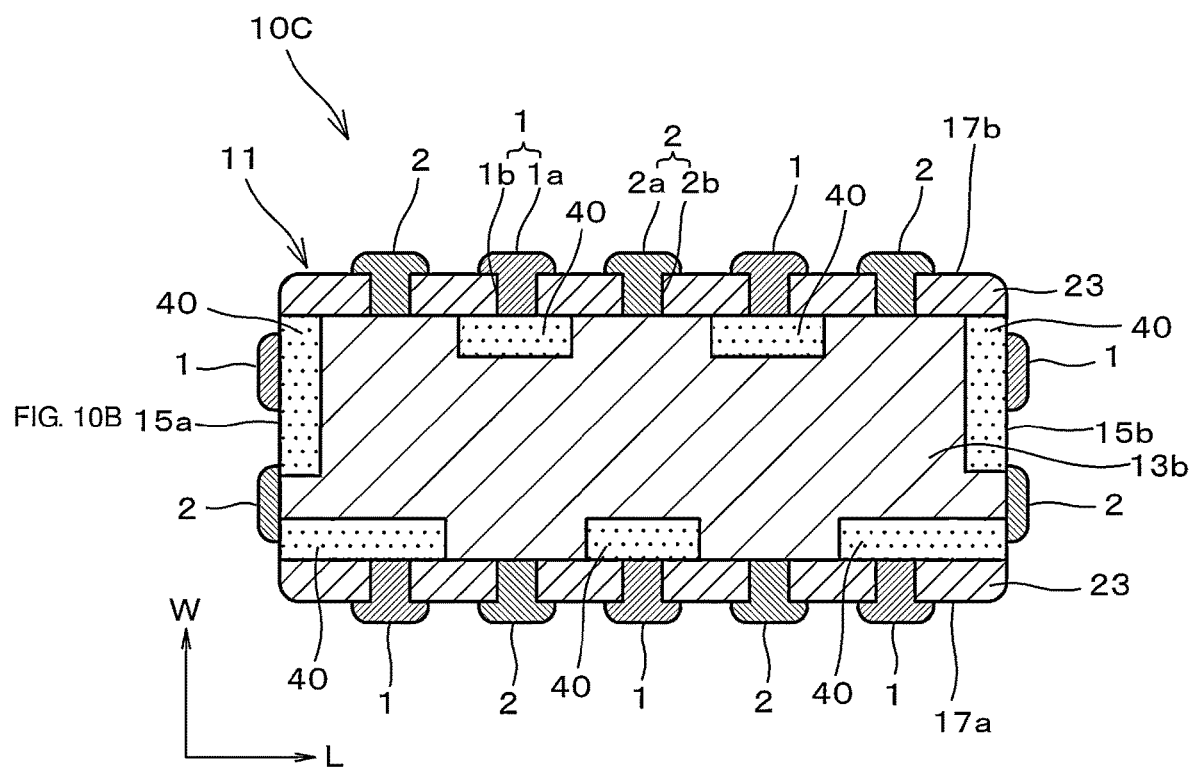
FIG. 10B is a sectional view thereof taken along a plane including a second inner electrode.

FIG. 10A is a sectional view of a multilayer ceramic capacitor 10C according to a preferred embodiment of the present invention in which the first outer electrodes 1 and the second outer electrodes 2 are alternately disposed on the first side surface 17a, the second side surface 17b, the first end surface 15a, and the second end surface 15b of the multilayer body 11, taken along a plane including one of the first inner electrodes 13a. FIG. 10B is a sectional view thereof taken along a plane including one of the second inner electrodes 13b. In FIGS. 10A and 10B, each margin portion 23 is shown as a single layer but may include margin layers.

Three of the first outer electrodes 1 and two of the second outer electrodes 2 are alternately disposed on the first side surface 17a. Three of the second outer electrodes 2 and two of the first outer electrodes 1 are alternately disposed on the second side surface 17b. One of the first outer electrodes 1 and one of the second outer electrodes 2 are disposed on the first end surface 15a. One of the first outer electrodes 1 and one of the second outer electrodes 2 are disposed on the second end surface 15b.

As shown in FIGS. 10A and 10B, the first outer electrodes 1 that are disposed on the first side surface 17a and the second side surface 17b of the multilayer body 11 include the respective surface portions 1a that are located on the surfaces of the multilayer body 11 and the respective through sections 1b that extend through the margin portions 23. As shown in FIGS. 10A and 10B, the second outer electrodes 2 that are disposed on the first side surface 17a and the second side surface 17b of the multilayer body 11 include the respective surface portions 2a that are located on the surfaces of the multilayer body 11 and the respective through sections 2b that extend through the margin portions 23.

As shown in FIG. 10A, each first inner electrode 13a has the notches 40 that overlap connections between the second inner electrodes 13b and the second outer electrodes 2 in the stacking direction T. As shown in FIG. 10B, each second inner electrode 13b has the notches 40 that overlap connections between the first inner electrodes 13a and the first outer electrodes 1 in the stacking direction T.

With the above structure, the first outer electrodes 1 are connected to the first inner electrodes 13a as shown in FIG. 10A but are not connected to the second inner electrodes 13b as shown in FIG. 10B. The second outer electrodes 2 are connected to the second inner electrodes 13b as shown in FIG. 10B but are not connected to the first outer electrodes 1 as shown in FIG. 10A.

Also in the multilayer ceramic capacitor 10C shown in FIGS. 10A and 10B, the first inner electrodes 13a include no extended portions that protrude in the width direction W for connection to the first outer electrodes 1, and the second inner electrodes 13b include no extended portions that protrude in the width direction W for connection to the second outer electrodes 2.

Fourth Modification

Figure 11A:
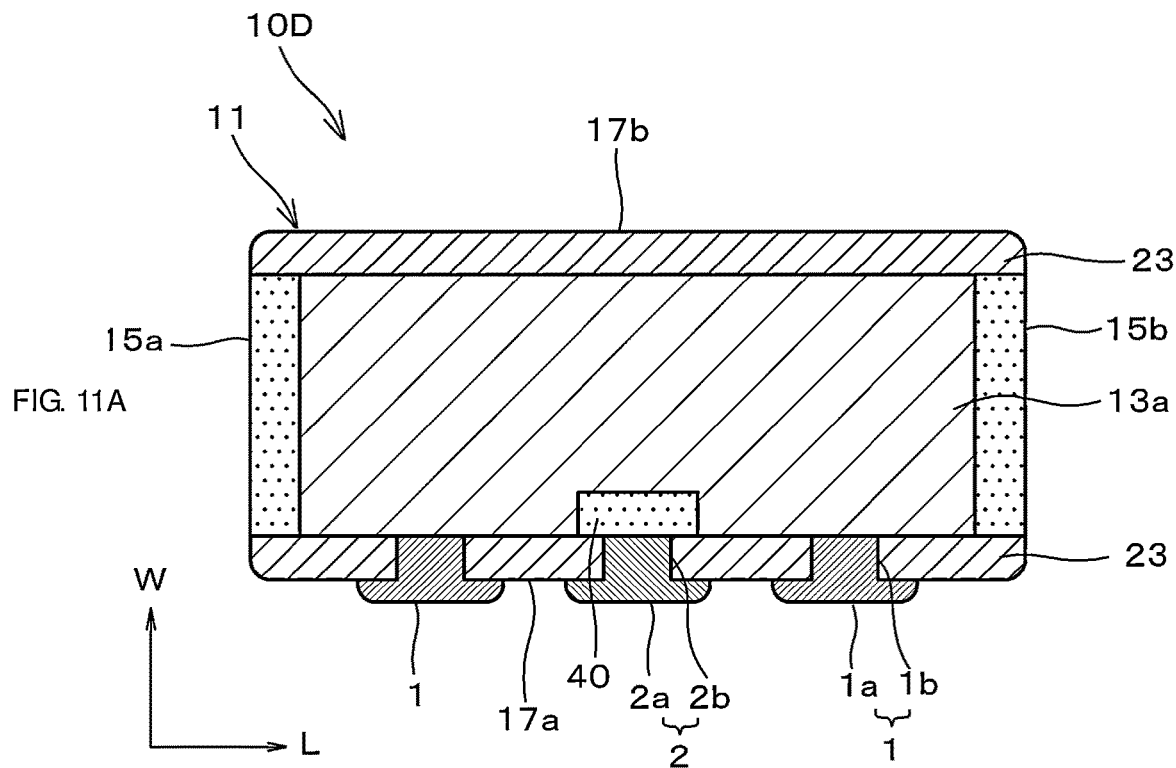
FIG. 11A is a sectional view of a multilayer ceramic capacitor according to a preferred embodiment of the present invention in which first outer electrodes and a second outer electrode are disposed on only the first side surface of the multilayer body, taken along a plane including a first inner electrode.
Figure 11B:
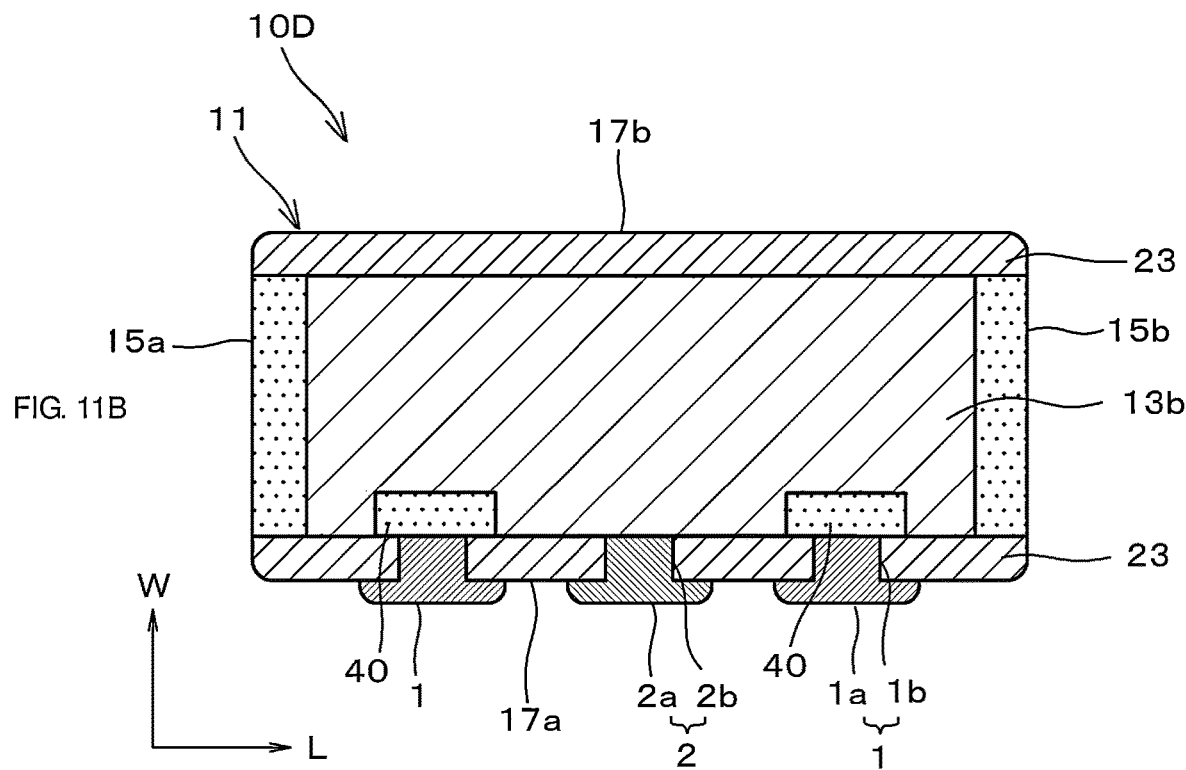
FIG. 11B is a sectional view thereof taken along a plane including a second inner electrode.

FIG. 11A is a sectional view of a multilayer ceramic capacitor 10D according to a preferred embodiment of the present invention in which the first outer electrodes 1 and the second outer electrode 2 are disposed on only the first side surface 17a, of the first side surface 17a and the second side surface 17b of the multilayer body 11, taken along a plane including one of the first inner electrodes 13a. FIG. 11B is a sectional view thereof taken along a plane including one of the second inner electrodes 13b. FIGS. 11A and 11B, each margin portion 23 is shown as a single layer but may include margin layers. The first outer electrodes 1 and the second outer electrode 2 may be disposed on only the second side surface 17b of the multilayer body 11.

Two of the first outer electrodes 1 and the single second outer electrode 2 that is located between the two first outer electrodes 1 are disposed on the first side surface 17a.

As shown in FIGS. 11A and 11B, the first outer electrodes 1 include the respective surface portions 1a that are located on the surface of the multilayer body 11 and the respective through sections 1b that extend through one of the margin portions 23, and the second outer electrode 2 includes the surface portion 2a that is located on the surface of the multilayer body 11 and the through section 2b that extends through the one of the margin portions 23.

As shown in FIG. 11A, each first inner electrode 13a has the notch 40 that overlaps connections between the second inner electrodes 13b and the second outer electrode 2 in the stacking direction T. As shown in FIG. 11B, each second inner electrode 13b has the notches 40 that overlap connections between the first inner electrodes 13a and the first outer electrodes 1 in the stacking direction T.

With the above structure, the first outer electrodes 1 are connected to the first inner electrodes 13a as shown in FIG. 11A but are not connected to the second inner electrodes 13b as shown in FIG. 11B. The second outer electrode 2 is connected to the second inner electrodes 13b as shown in FIG. 11B but is not connected to the first outer electrodes 1 as shown in FIG. 11A.

Also in the multilayer ceramic capacitor 10D shown in FIGS. 11A and 11B, the first inner electrodes 13a include no extended portions that protrude in the width direction W for connection to the first outer electrodes 1, and the second inner electrodes 13b include no extended portions that protrude in the width direction W for connection to the second outer electrode 2.

Fifth Modification

Figure 12A:
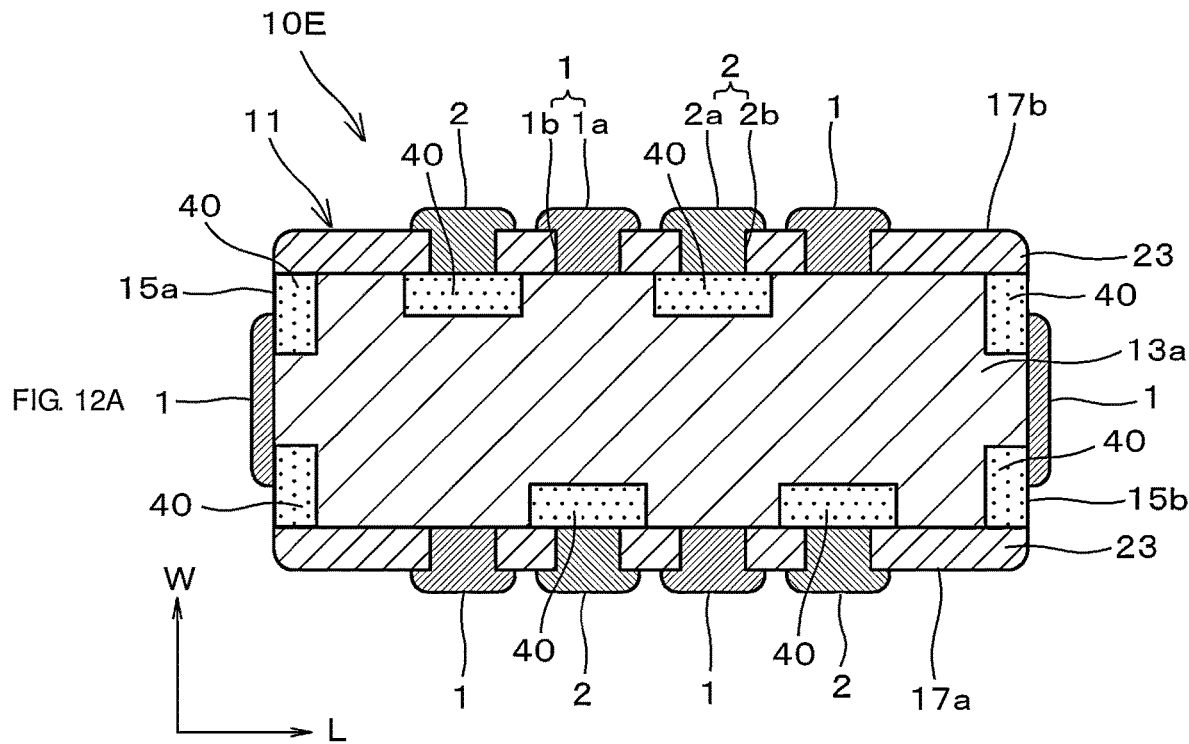
FIG. 12A is a sectional view of a multilayer ceramic capacitor according to a preferred embodiment of the present invention in which first outer electrodes are disposed on the first side surface, the second side surface, the first end surface, and the second end surface of the multilayer body, and second outer electrodes are disposed on the first side surface and the second side surface, taken along a plane including a first inner electrode.
Figure 12B:
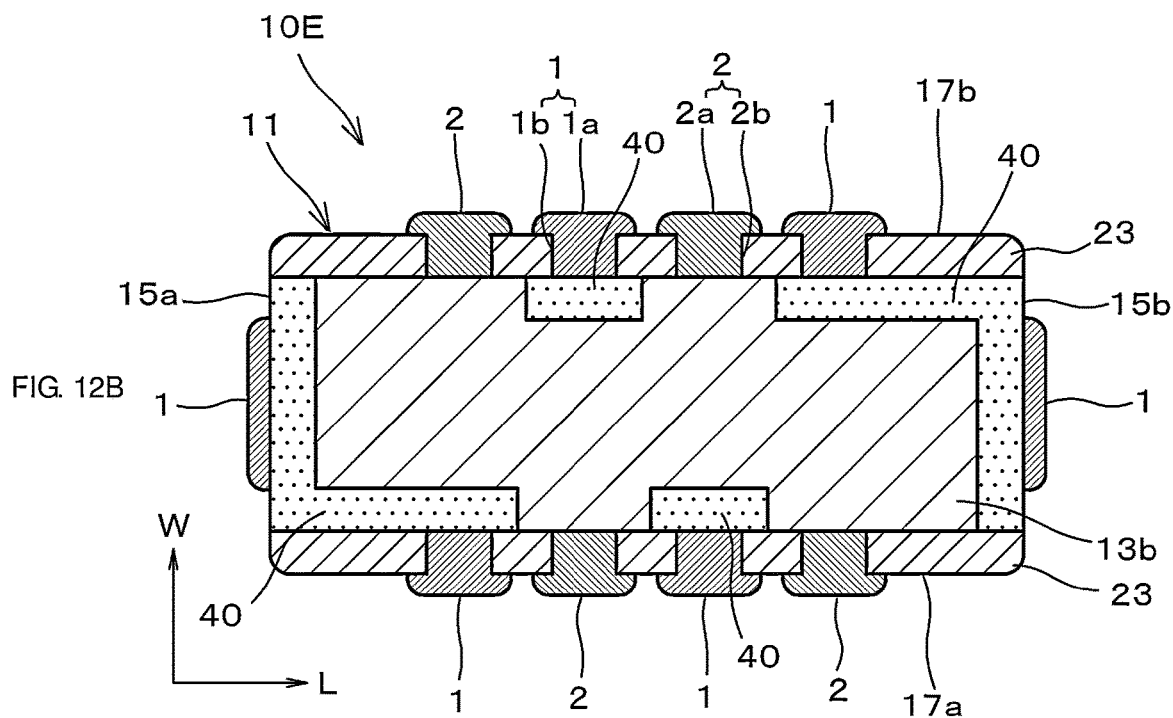
FIG. 12B is a sectional view thereof taken along a plane including a second inner electrode.

FIG. 12A is a sectional view of a multilayer ceramic capacitor 10E according to a preferred embodiment of the present invention in which the first outer electrodes 1 are disposed on the first side surface 17a, the second side surface 17b, the first end surface 15a, and the second end surface 15b of the multilayer body 11, and the second outer electrodes 2 are disposed on the first side surface 17a and the second side surface 17b, taken along a plane including one of the first inner electrodes 13a. FIG. 12B is a sectional view thereof taken along a plane including one of the second inner electrodes 13b. FIGS. 12A and 12B, each margin portion 23 is shown as a single layer but may include margin layers.

Two of the first outer electrodes 1 and two of the second outer electrodes 2 are alternately disposed on the first side surface 17a. Two of the first outer electrodes 1 and two of the second outer electrodes 2 are alternately disposed on the second side surface 17b of the multilayer body 11. One of the first outer electrodes 1 is disposed on the first end surface 15a, and the other first outer electrode is disposed on the second end surface 15b.

As shown in FIGS. 12A and 12B, the first outer electrodes 1 that are disposed on the first side surface 17a and the second side surface 17b of the multilayer body 11 include the respective surface portions 1a that are located on the surfaces of the multilayer body 11 and the respective through sections 1b that extend through the margin portions 23. As shown in FIGS. 12A and 12B, the second outer electrodes 2 that are disposed on the first side surface 17a and the second side surface 17b of the multilayer body 11 include the respective surface portions 2a that are located on the surfaces of the multilayer body 11 and the respective through sections 2b that extend through the margin portions 23.

As shown in FIG. 12A, each first inner electrode 13a has the notches 40 that overlap connections between the second inner electrodes 13b and the second outer electrodes 2 in the stacking direction T. As shown in FIG. 12B, each second inner electrode 13b has the notches 40 that overlap connections between the first inner electrodes 13a and the first outer electrodes 1 in the stacking direction T.

With the above structure, the first outer electrodes 1 are connected to the first inner electrodes 13a as shown in FIG. 12A but are not connected to the second inner electrodes 13b as shown in FIG. 12B. The second outer electrodes 2 are connected to the second inner electrodes 13b as shown in FIG. 12B but are not connected to the first inner electrodes 13a as shown in FIG. 12A.

In the multilayer ceramic capacitor 10E shown in FIGS. 12A and 12B, the first inner electrodes 13a include no extended portions that protrude in the width direction W for connection to the first outer electrodes 1, and the second inner electrodes 13b include no extended portions that protrude in the width direction W for connection to the second outer electrodes 2.

The present invention is not limited to the above-described preferred embodiments. Various applications and additional modifications can be made within the scope of the present invention.

For example, in the above multilayer ceramic capacitor 10, each through section 2b of the second outer electrodes 2 may have a dimension near the inner layer portion 21 in the length direction L that is smaller than those near the first side surface 17a and the second side surface 17b. Similarly, in the structures according to the first to fifth modifications, each through section of the outer electrodes may have a dimension near the inner layer portion 21 in the length direction L that is smaller than those near the side surfaces.

In the description according to the preferred embodiments, each margin portion 23 includes the margin layers 23a and 23b that are stacked in the width direction W. However, the margin portion 23 may be defined by a single layer.

In an electronic component according to preferred embodiments of the present invention, at least one of outer electrodes is disposed on at least one of a first side surface or a second side surface of a multilayer body and is directly connected to inner electrodes at positions spaced away from the at least one of the first side surface or the second side surface toward the inside of the multilayer body, as described above. Accordingly, any electronic component that has the above structure other than the electronic components according to the preferred embodiments corresponds to an electronic component of the present invention.

While a preferred embodiment of the present invention and modifications thereof have been described above, it is to be understood that variations and additional modifications will be apparent to those skilled in the art without departing from the scope and spirit of the present invention. The scope of the present invention, therefore, is to be determined solely by the following claims.

What is claimed is:

1. An electronic component comprising:
    a multilayer body including a plurality of inner electrodes and a plurality of dielectric layers that are alternately stacked; and
    a plurality of outer electrodes that are connected to the plurality of inner electrodes; wherein
    the multilayer body includes a first main surface and a second main surface that are opposite to each other in a stacking direction, a first side surface and a second side surface that are opposite to each other in a width direction perpendicular or substantially perpendicular to the stacking direction, and a first end surface and a second end surface that are opposite to each other in a length direction perpendicular or substantially perpendicular to the stacking direction and the width direction; and
    the plurality of outer electrodes are located on the first side surface of the multilayer body and are connected to the plurality of inner electrodes at positions spaced away from the first side surface toward an inside of the multilayer body.

2. The electronic component according to claim 1, wherein
    the multilayer body includes a margin portion in which the plurality of inner electrodes are not present when a section of the multilayer body including the length direction and the width direction is viewed in the stacking direction; and
    each of the plurality of outer electrodes includes a through section that extends through the margin portion and is directly connected to the plurality of inner electrodes by the through section.

3. The electronic component according to claim 2, wherein
    the multilayer body includes an outer layer portion in which the plurality of inner electrodes are not present except for the margin portion when a section of the multilayer body including the width direction and the stacking direction is viewed in the length direction; and
    each of the plurality of outer electrodes also includes the through section at a height position in the stacking direction at which the outer layer portion is located.

4. The electronic component according to claim 3, wherein the outer layer portion is provided on two sides of an inner layer portion of the multilayer body in the stacking direction.

5. The electronic component according to claim 4, wherein the outer layer portion and the inner layer portion include a same or substantially a same dielectric material.

6. The electronic component according to claim 2, wherein a dimension of the margin portion in the width direction is no less than about 5 μm and no more than about 30 μm.

7. The electronic component according to claim 2, wherein the margin portion includes margin layers that are stacked in the width direction.

8. The electronic component according to claim 2, wherein an average particle diameter of a dielectric particle that is included in the plurality of dielectric layers that are located between the plurality of inner electrodes is larger than an average particle diameter of a dielectric particle that is included in the margin portion.

9. The electronic component according to claim 2, wherein a mole ratio of Si to Ti included in an outer portion of the margin portion is larger than a mole ratio of Si to Ti included in an inner portion of the margin portion.

10. The electronic component according to claim 1, wherein the plurality of outer electrodes are located on at least one of the first side surface and the second side surface.

11. The electronic component according to claim 1, wherein
the plurality of inner electrodes include a first inner electrode and a second inner electrode;
the plurality of outer electrodes include at least one first outer electrode that is located on at least one of the first end surface or the second end surface of the multilayer body and that is electrically connected to the first inner electrode, and at least one second outer electrode that is located on at least one of the first side surface or the second side surface of the multilayer body and that is electrically connected to the second inner electrode;
the second inner electrode is not in contact with the at least one of the first end surface or the second end surface of the multilayer body on which the at least one first outer electrode is located; and
the first inner electrode includes a notch that overlaps, in the stacking direction, a connection between the second inner electrode and the at least one second outer electrode.

12. The electronic component according to claim 11, wherein
the second inner electrode includes Si and Ti; and
a mole ratio of Si to Ti included in an end portion of the second inner electrode in the width direction is larger than that in a central portion of the second inner electrode in the width direction.

13. The electronic component according to claim 11, wherein
the first outer electrode is not electrically connected to the second inner electrode; and
the second outer electrode is not electrically connected to the first inner electrode.

14. The electronic component according to claim 11, wherein the first inner electrode includes a plurality of notches that each overlap, in the stacking direction, a corresponding connection between the second inner electrode and the at least one second outer electrode.

15. The electronic component according to claim 1, wherein the plurality of outer electrodes and the plurality of inner electrodes include a common material including a dielectric material, and an amount of the common material that is included in the plurality of outer electrodes is larger than an amount of the common material that is included in the plurality of inner electrodes.

16. The electronic component according to claim 1, wherein a dimension, in the width direction, of one of the plurality of inner electrodes that is located at a central portion in the stacking direction is larger than a dimension, in the width direction, of another inner electrode that is located at an outer portion in the stacking direction.

17. The electronic component according to claim 1, wherein
each of the plurality of outer electrodes includes a through section that extends through the margin portion;
the plurality of inner electrodes include a notch that overlaps, in the stacking direction, a connection between the second inner electrode and the at least one second outer electrode; and
each end of the notch in the length direction is located closer to a center of the multilayer body than each end of the through section in the length direction.

* * * * *